(12) United States Patent
Heijnen

(10) Patent No.: US 9,290,062 B2
(45) Date of Patent: Mar. 22, 2016

(54) TYRE AND TYRE BUILDING METHOD

(75) Inventor: Philip Heijnen, Rome (IT)

(73) Assignee: BRIDGESTONE CORPORATION, Tokyo (JP)

( * ) Notice: Subject to any disclaimer, the term of this patent is extended or adjusted under 35 U.S.C. 154(b) by 129 days.

(21) Appl. No.: 13/978,773

(22) PCT Filed: Jan. 17, 2012

(86) PCT No.: PCT/IB2012/050226
§ 371 (c)(1),
(2), (4) Date: Jul. 9, 2013

(87) PCT Pub. No.: WO2012/098500
PCT Pub. Date: Jul. 26, 2012

(65) Prior Publication Data
US 2013/0292026 A1    Nov. 7, 2013

(30) Foreign Application Priority Data
Jan. 17, 2011   (IT) .............. TO2011A0024

(51) Int. Cl.
| | |
|---|---|
| *B60C 15/00* | (2006.01) |
| *B60C 15/06* | (2006.01) |
| *B29D 30/06* | (2006.01) |
| *B29D 30/20* | (2006.01) |
| *B29D 30/28* | (2006.01) |
| *B29D 30/32* | (2006.01) |

(Continued)

(52) U.S. Cl.
CPC .............. *B60C 15/06* (2013.01); *B29D 30/32* (2013.01); *B29D 30/50* (2013.01); *B60C 15/0607* (2013.01); *B29D 2030/482* (2013.01)

(58) Field of Classification Search
CPC .... B60C 15/00; B60C 15/06; B60C 15/0603; B60C 15/0607
See application file for complete search history.

(56) References Cited

U.S. PATENT DOCUMENTS

| | | | | |
|---|---|---|---|---|
| 3,406,733 A | * | 10/1968 | Boileau ......................... | 152/542 |
| 4,168,336 A | | 9/1979 | White et al. | |
| 4,966,216 A | * | 10/1990 | Kawasaki et al. ............. | 152/556 |

(Continued)

FOREIGN PATENT DOCUMENTS

| | | |
|---|---|---|
| DE | 43 13 698 A1 | 10/1994 |
| DE | 10 2008 049 315 A1 | 4/2010 |

(Continued)

OTHER PUBLICATIONS

International Search Report issued in International Patent Application No. PCT/IB2012/050226 mailed Apr. 10, 2012.

(Continued)

*Primary Examiner* — Justin Fischer
(74) *Attorney, Agent, or Firm* — Oliff PLC

(57) ABSTRACT

A tire having two beads, with a toroidal body ply wound about the two beads to form two turn-ups, and two bead fillers, each contacting a bead and are partly enclosed inside a turn-up of the body ply. The bead filler includes a first elastomer ring, which is initially placed flat and between the body ply, and a bead, which is turned up about the bead when forming the corresponding turn-up of the body ply, to bring two opposite ends of the first elastomer ring into close proximity. The bead filler is cured, after being turned up about the bead, to connect the two opposite ends of the first elastomer ring, while at the same time eliminating the air trapped inside the turn-up of the body ply.

21 Claims, 13 Drawing Sheets

(51) Int. Cl.
    *B29D 30/50*     (2006.01)
    *B29D 30/48*     (2006.01)

(56) References Cited

U.S. PATENT DOCUMENTS

| 5,350,470 | A | | 9/1994 | Mochel et al. | |
|---|---|---|---|---|---|
| 5,513,683 | A | * | 5/1996 | Causa et al. | 152/209.4 |
| 2011/0186201 | A1 | * | 8/2011 | Buxton et al. | 152/541 |

FOREIGN PATENT DOCUMENTS

| EP | 0 192 112 | A2 | | 8/1986 |
|---|---|---|---|---|
| EP | 0 310 417 | A2 | | 4/1989 |
| EP | 780248 | | * | 6/1997 |
| EP | 2 239 130 | A1 | | 10/2010 |
| GB | 1003712 | | | 9/1965 |
| JP | 2002-225504 | | * | 8/2002 |
| JP | 2002-254910 | | * | 9/2002 |
| KR | 2010044660 | | * | 4/2010 |

OTHER PUBLICATIONS

Written Opinion of the International Searching Authority issued in International Patent Application No. PCT/IB2012/050226 mailed Apr. 10, 2012.
International Preliminary Report on Patentability issued in International Patent Application No. PCT/IB2012/050226 mailed Apr. 24, 2013.

* cited by examiner

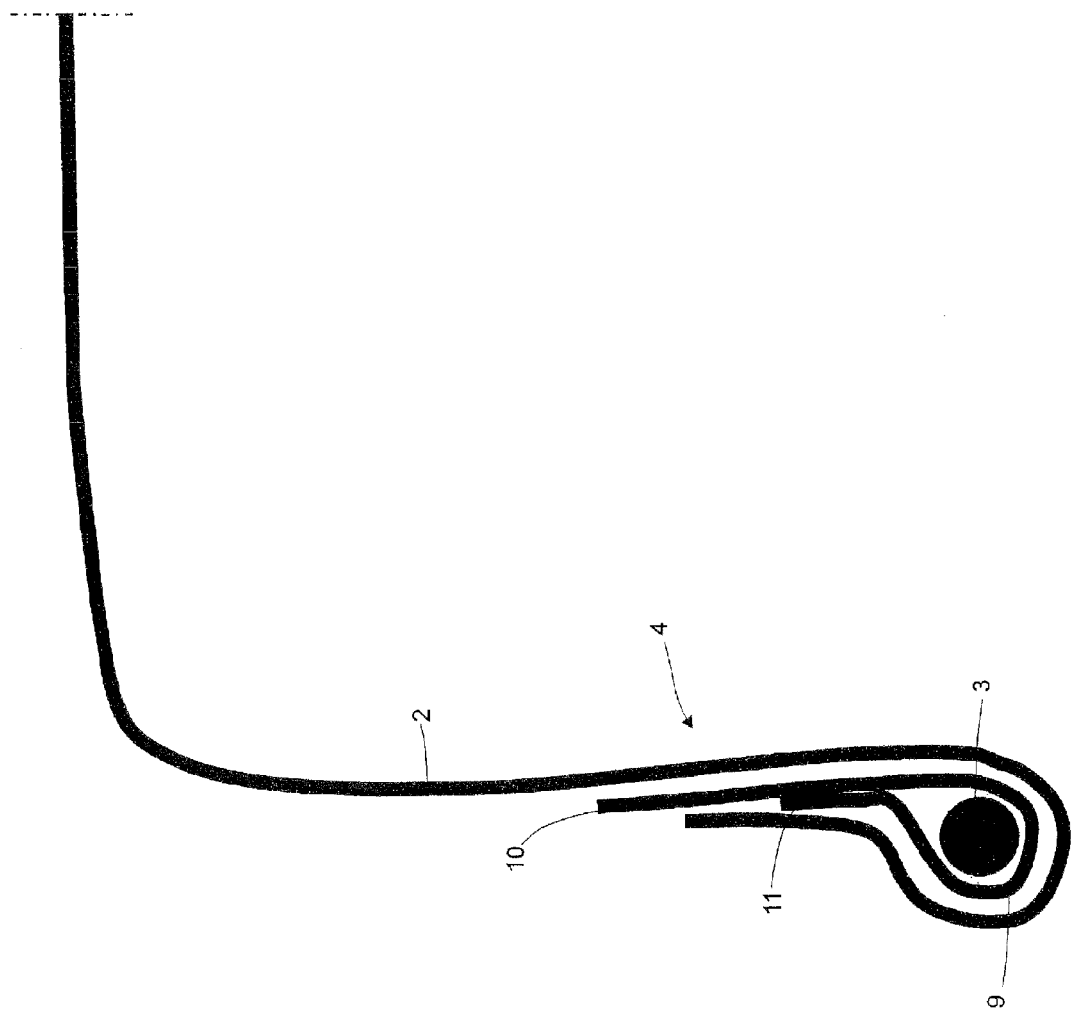

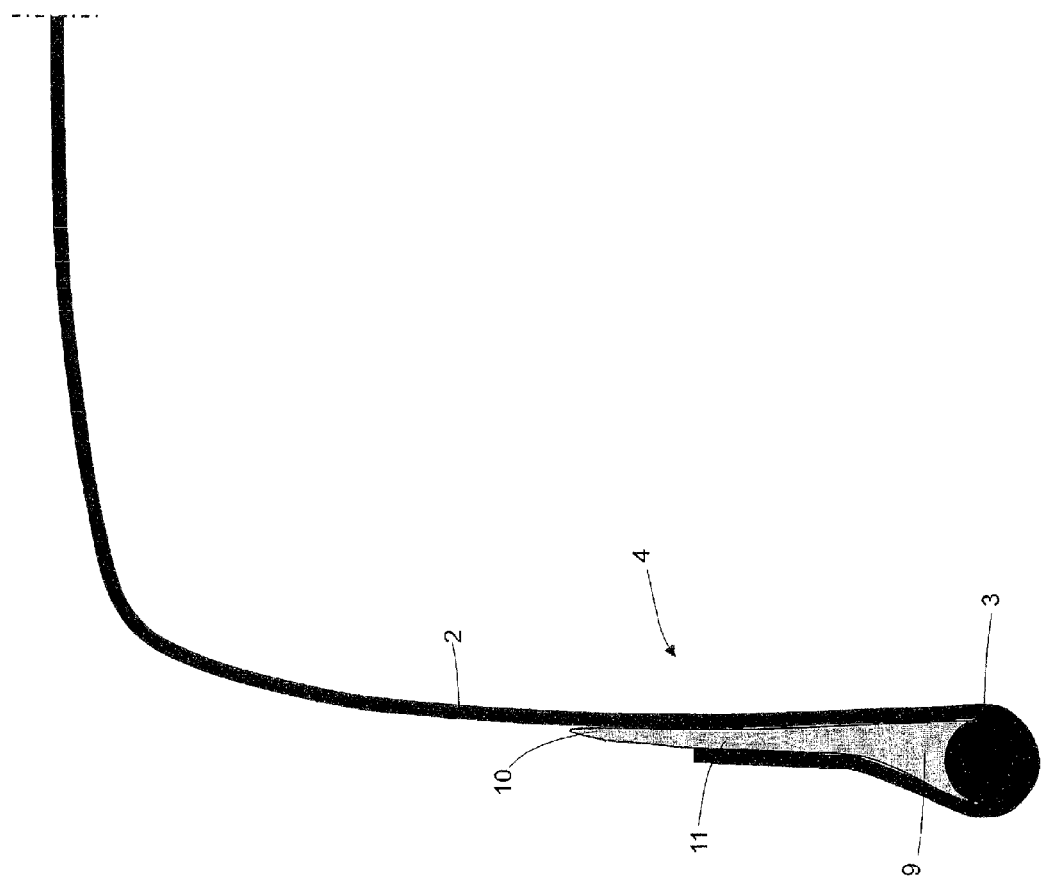

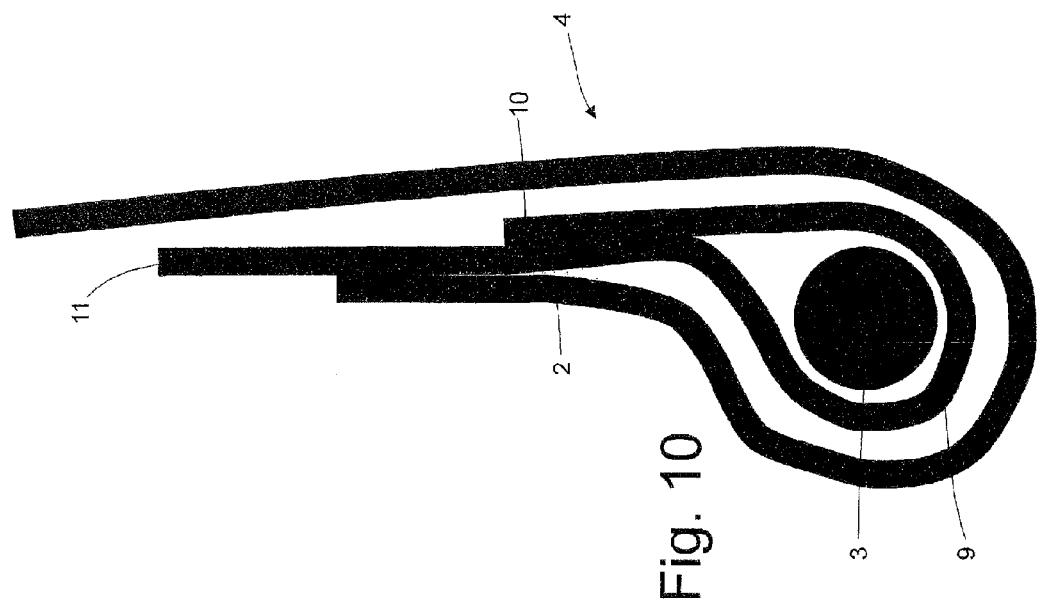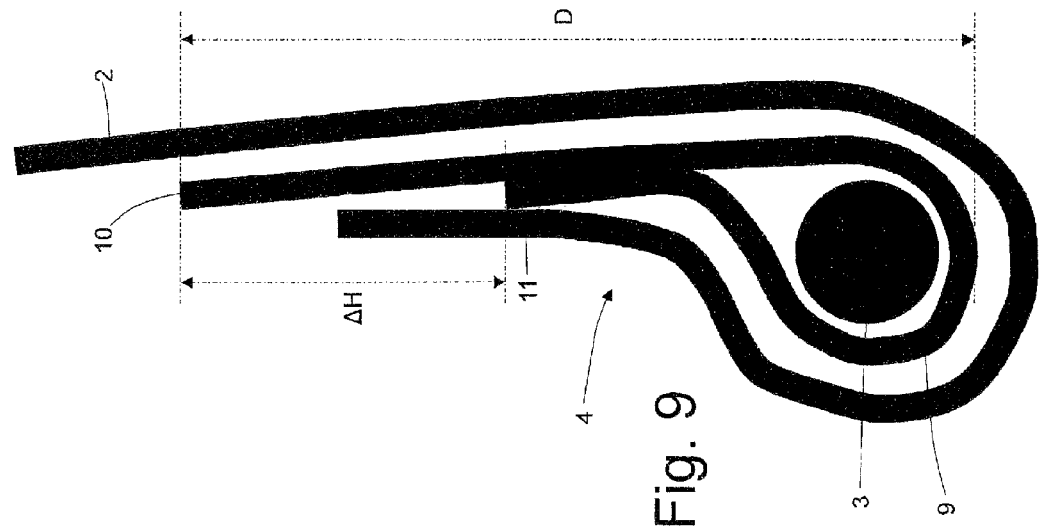

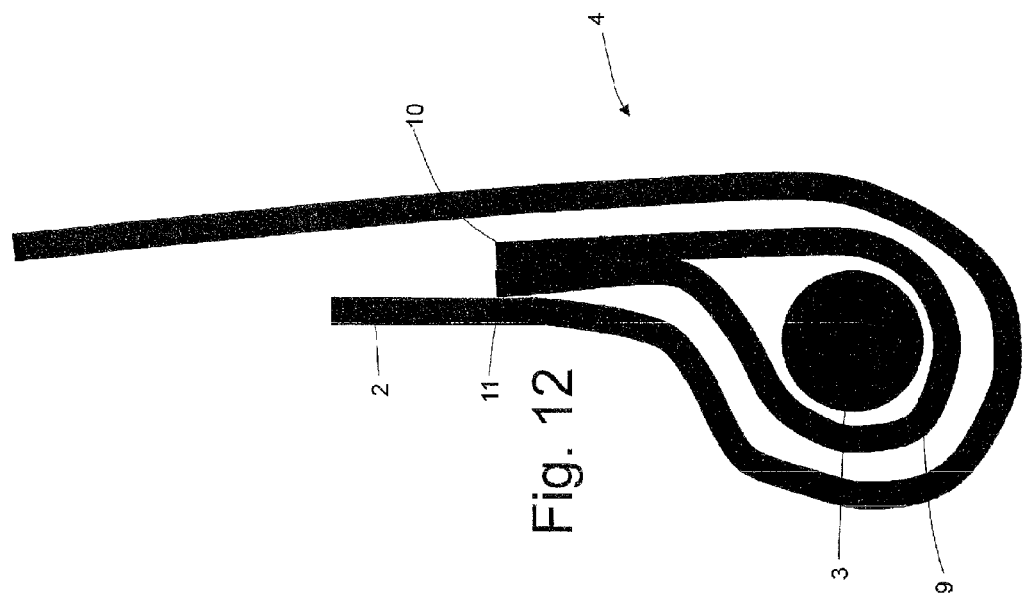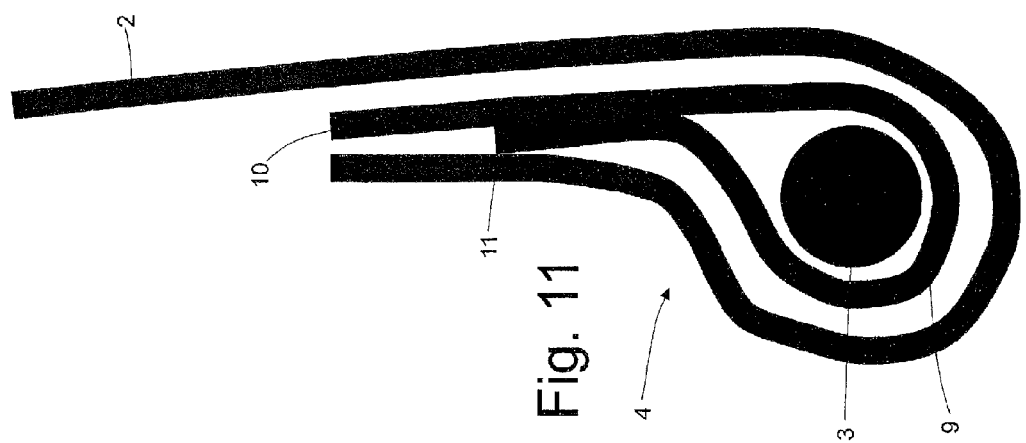

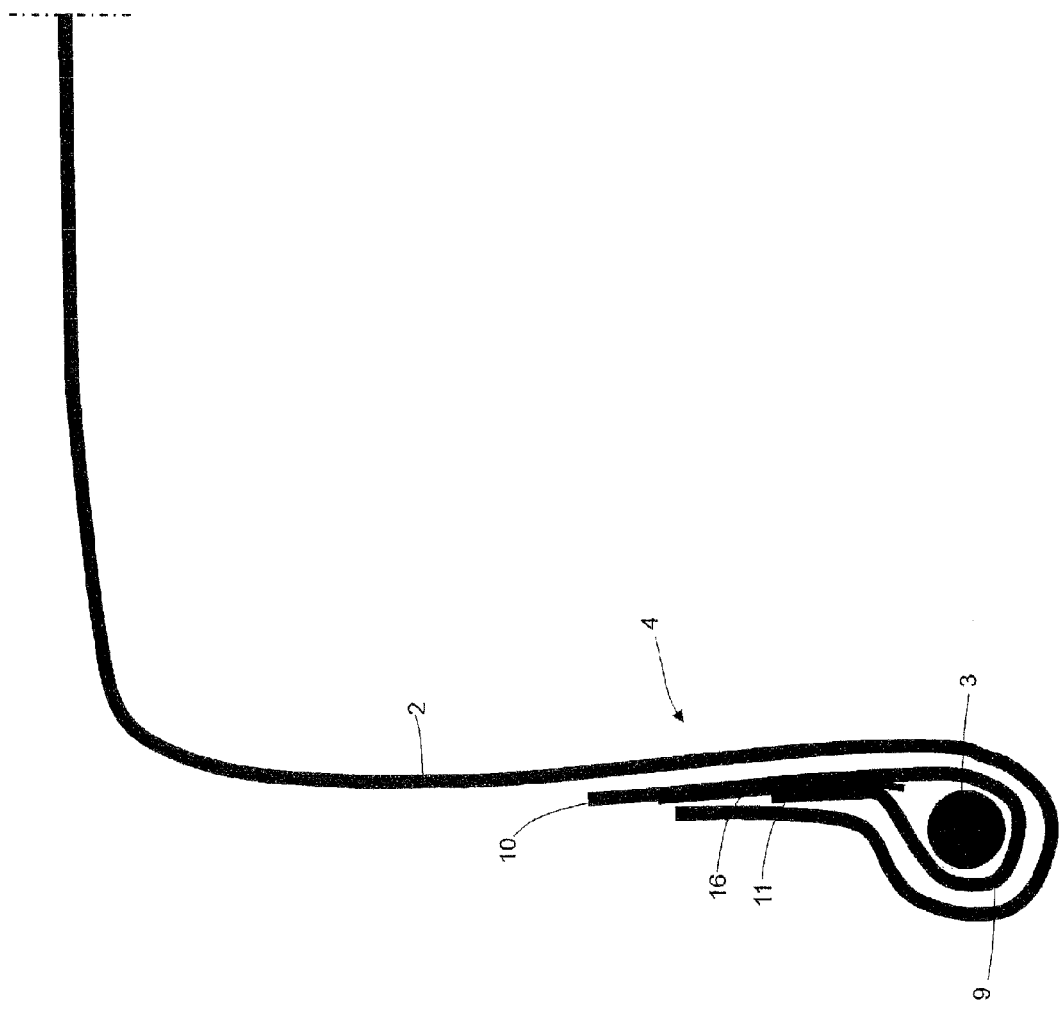

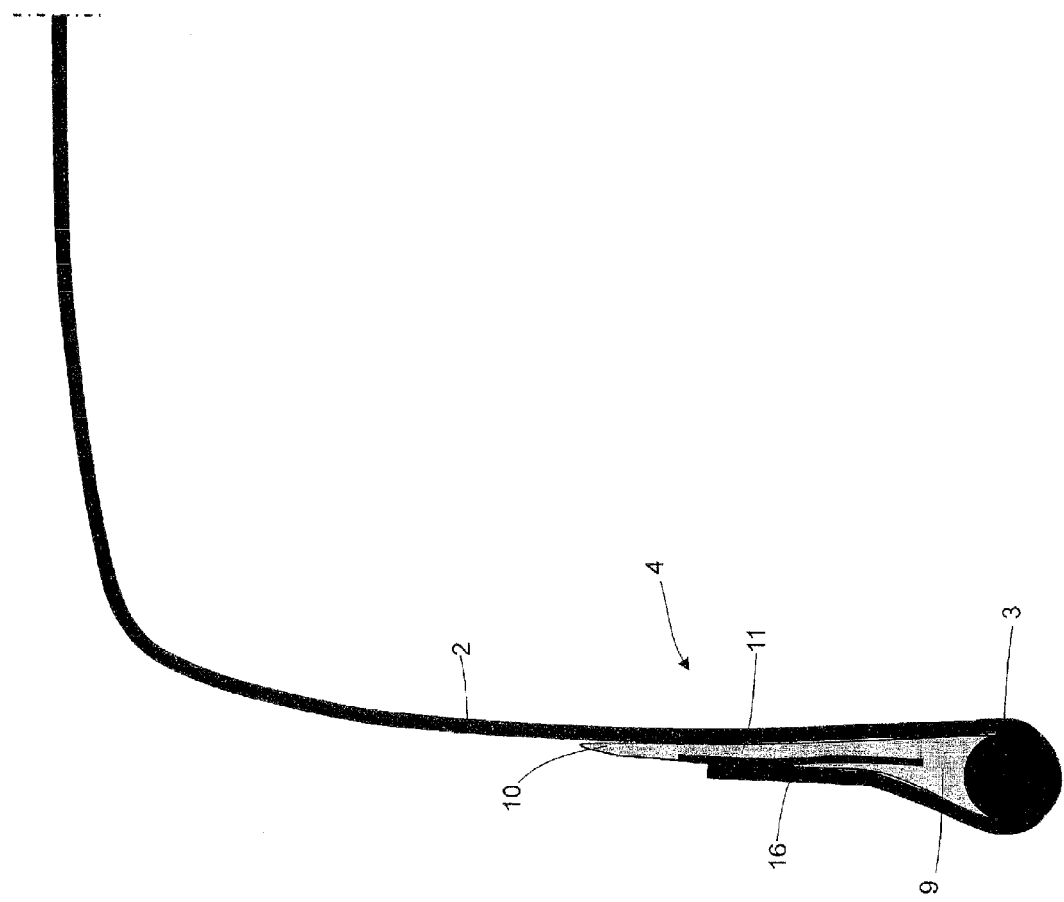

TYRE AND TYRE BUILDING METHOD

TECHNICAL FIELD

The present invention relates to a tyre and a tyre building method.

BACKGROUND ART

A tyre comprises a toroidal body ply turned up about two beads and supporting a tread. A tread belt, normally comprising a number of superimposed tread plies, is interposed between the body ply and the tread. And each bead comprises a number of metal cords embedded in elastomer to form a so-called bead bundle, and is fitted with a bead filler made of tough elastomer to increase the rigidity of the sidewalls of the tyre, and which has a triangular cross section, with its base resting on the bead.

As described, for example, in Patent Application EP0310417A2, each bead filler is normally fitted to the corresponding bead before building the tyre, i.e. the two beads, together with the bead fillers, are placed on the body ply laid flat about the building drum, prior to the turn-up operation.

The main purpose of the bead filler is to ensure a continuous variation in the elastic response of the relatively rigid bead materials and the relatively elastic sidewalls of the tyre. The presence of the bead filler, however, has a negative effect on the mass, and therefore the rolling performance, of the tyre, both directly, on account of the mass of the bead filler itself, and indirectly, by requiring relatively wide turn-up portions of the body ply.

One of the ways most commonly adopted to improve tyre performance is to reduce the overall mass of the tyre. That is, given the relatively high speed at which the tyre rotates in use, reducing its mass also brings about a corresponding reduction in rotation-related mechanical inertia.

Patent application EP2239130A1 discloses a tyre building method, in which two beads are placed on top of the body ply, between the body ply and each bead is placed, flat, an elastomer ring, and then the body ply is turned up about the two beads to form two turn-ups, each at least partly enclosing a bead, and to U-fold each elastomer ring about the bead to bring two opposite ends of the elastomer ring into close proximity.

Patent application DE102008049315A1 discloses a tyre, in which each bead filler is at least partly enclosed inside a turn-up of the body ply and has an elastomer ring, which is placed between the body ply and the bead and is turned up about the bead to bring two opposite ends of the elastomer ring into close proximity so that the two opposite ends are connected each to the other by curing.

DESCRIPTION OF THE INVENTION

It is an object of the present invention to provide a tyre and a tyre building method, which are cheap and easy to implement, and which at the same time provide for reducing the overall mass of the tyre.

According to the present invention, there are provided a tyre and a tyre building method as claimed in the accompanying Claims.

BRIEF DESCRIPTION OF THE DRAWINGS

A number of non-limiting embodiments of the invention will be described by way of example with reference to the accompanying drawings, in which:

FIGS. 7 and 8 show schematics of the FIG. 1 tyre bead area at the end of the building stage and before and after curing respectively;

FIG. 9 shows a larger-scale view of a detail in FIG. 7;

FIGS. 10, 11 and 12 show alternative embodiments of the FIG. 9 detail;

FIGS. 14 and 15 show schematics of the tyre bead area of the FIG. 13 embodiment at the end of the building stage and before and after curing respectively.

PREFERRED EMBODIMENTS OF THE INVENTION

Figure 1:
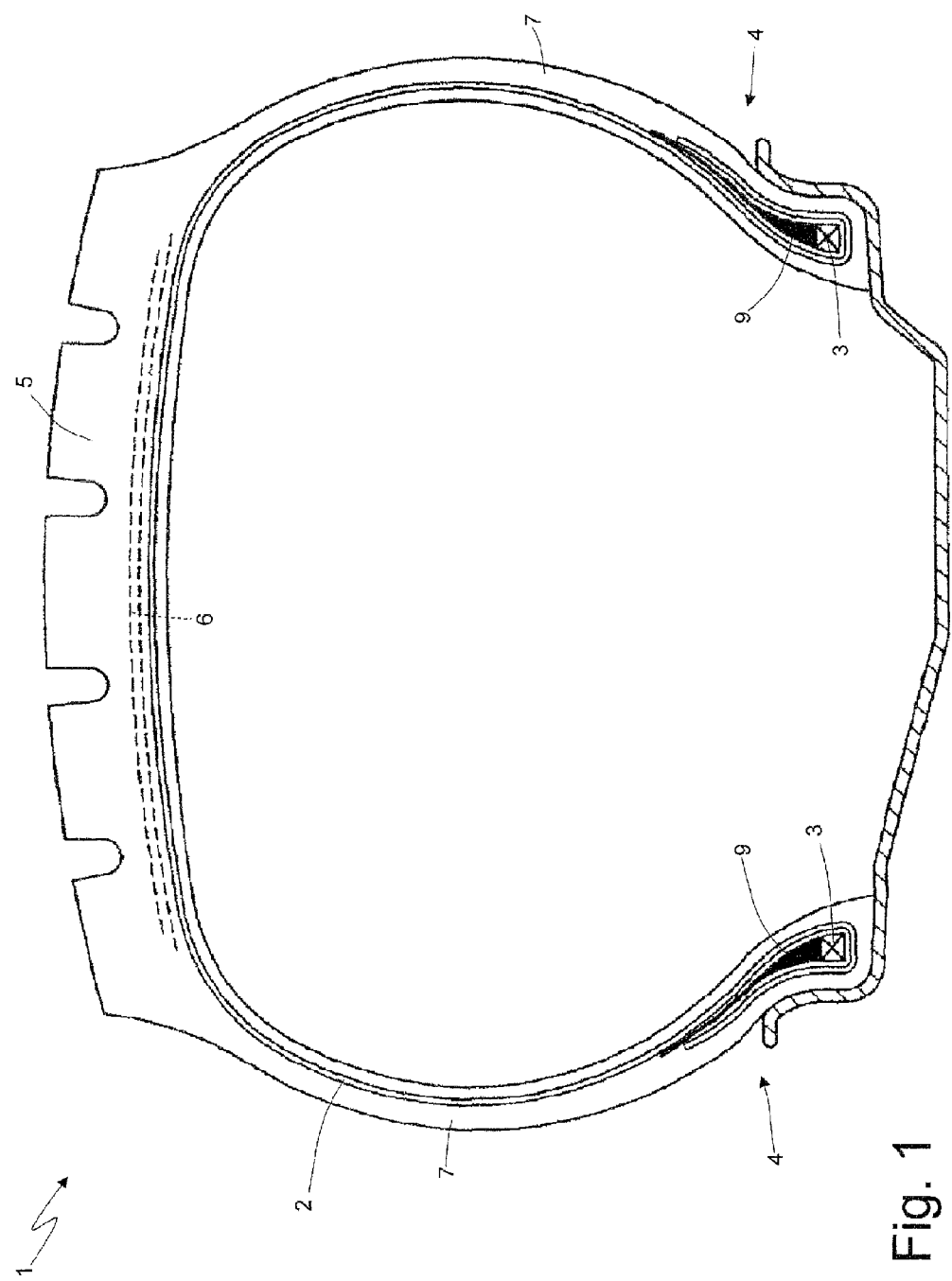
FIG. 1 shows a schematic cross section of part of a tyre in accordance with the present invention.

Number 1 in FIG. 1 indicates as a whole a tyre comprising a toroidal body ply 2 wound about two beads 3 to form two turn-ups 4 about beads 3, each of which is made up of a number of metal cords embedded in elastomer to form a so-called bead bundle; a tread 5 supported by body ply 2; a tread belt 6 made up of a number of tread plies and interposed between body ply 2 and tread 5; two sidewalls 7 supported by body ply 2 and located between tread 5 and beads 3; and two bead fillers 8, each positioned contacting a bead 3 and at least partly enclosed in a turn-up 4 of body ply 2.

Figure 2:
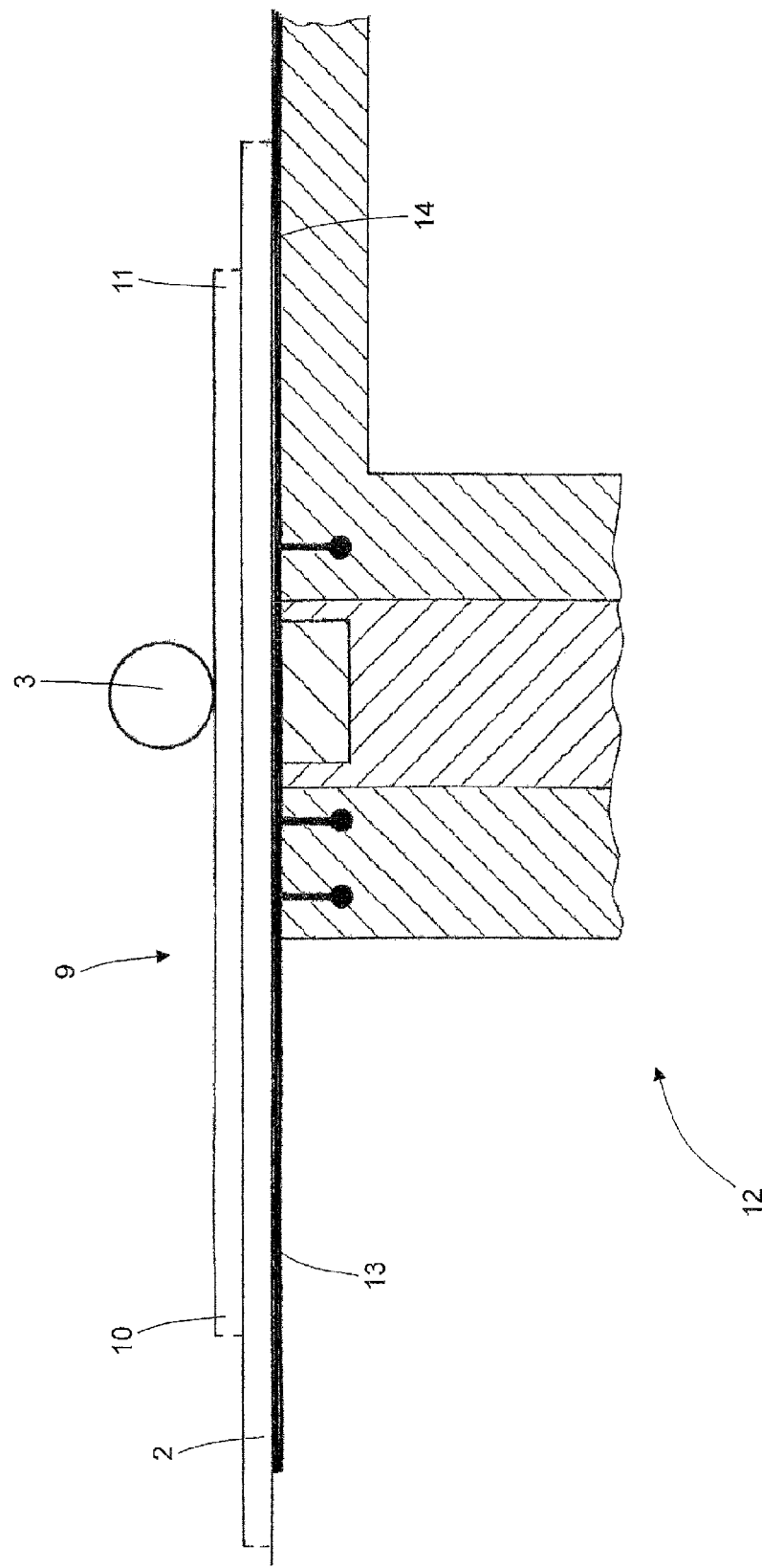
FIGS. 2 to 4 show partial schematics, with parts removed for clarity, of a tyre building drum at successive stages in the building of the FIG. 1 tyre.
Figure 3:
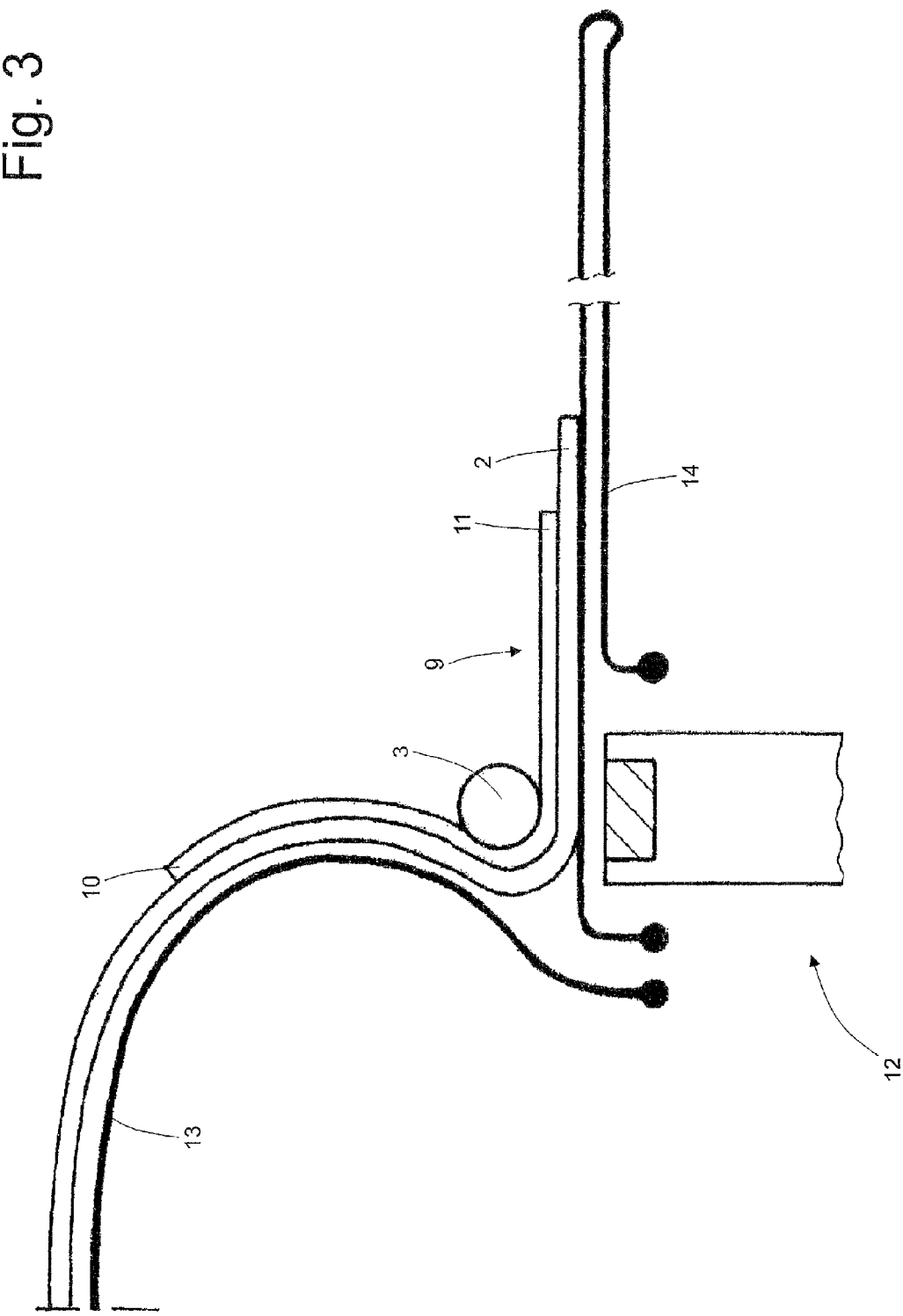
Figure 4:
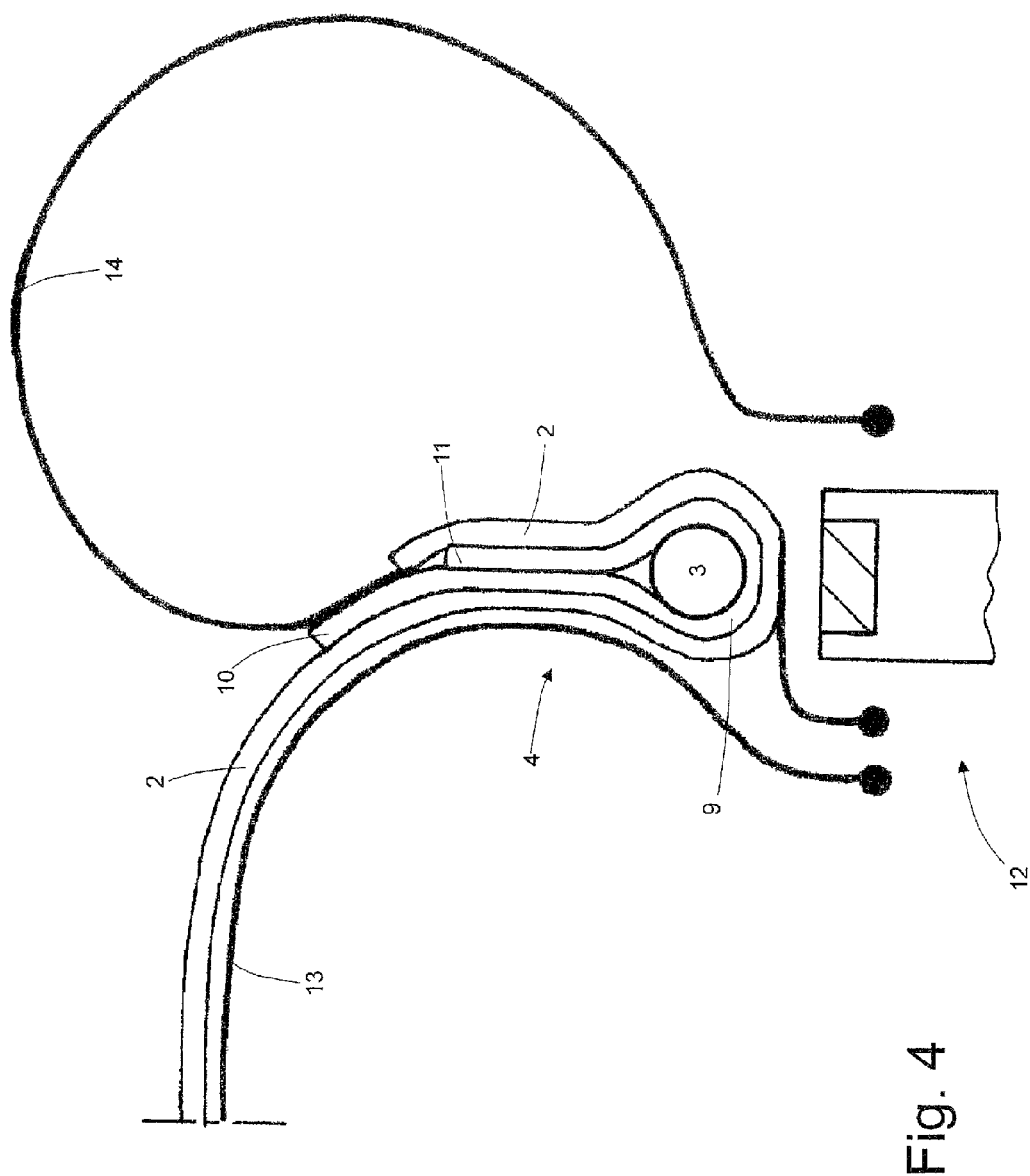
Figure 5:
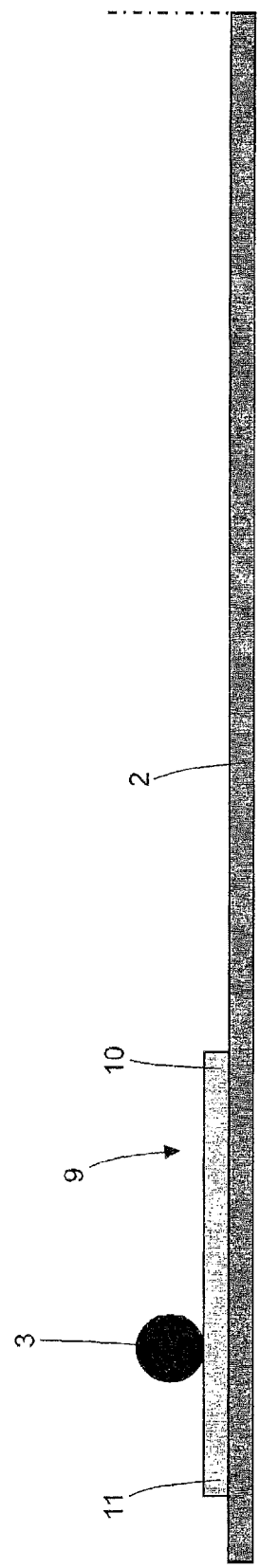
FIG. 5 shows a larger-scale view of a detail in FIG. 2.

As shown in FIGS. 2 to 4, each bead filler 8 comprises an elastomer ring 9, which is initially laid flat between body ply 2 and bead 3, when body ply 2 is still spread out flat (as shown in FIG. 2), and is folded into a U about bead 3, when forming the corresponding turn-up 4 of body ply 2, to bring two opposite ends 10 and 11 of elastomer ring 9 into contact with each other (as shown in FIGS. 3 and 4). Each bead filler 8 is then completed by curing elastomer ring 9, folded into a U about bead 3, to connect (integrate, combine) the two opposite ends 10 and 11 of elastomer ring 9, and at the same time eliminate any air (i.e. gaps) inside turn-up 4 of body ply 2. As shown clearly in FIGS. 2, 5 and 6, elastomer ring 9 initially has a rectangular cross section and is of constant thickness, but, when building tyre 1, may vary (increase or decrease) locally in thickness, due to stress and pressure exerted on it (especially at the curing stage).

To build tyre 1, as shown in FIG. 2, body ply 2 is laid flat about a tyre building drum 12; the two elastomer rings 9 are then laid flat on top of body ply 2; and, finally, the two beads 3 are placed on top of the two elastomer rings 9 (i.e. on top of body ply 2), so that each elastomer ring 9 is interposed between body ply 2 and a bead 3. Preferably, the two elastomer rings 9 are laid on top of body ply 2 after body ply 2 is laid about tyre building drum 12; and the two beads 3 are placed on top of the two elastomer rings 9 after elastomer rings 9 are laid about tyre building drum 12 and on top of body ply 2, so as to ensure more accurate positioning of elastomer rings 9 and beads 3, and so improve the overall symmetry (and reduce rolling vibration) of tyre 1.

At this point, as shown in FIGS. 3 and 4, bladders 13 and 14 on tyre building drum 12 are inflated to turn body ply 2, together with elastomer rings 9, up around beads 3 to form the two turn-ups 4 of body ply 2 and, at the same time, fold each elastomer ring 9 into a U about bead 3 and bring the two opposite ends 10 and 11 of elastomer ring 9 into contact with each other. Finally, the pressure and heat applied to tyre 1 at the final curing stage weld the two opposite ends 10 and 11 of each elastomer ring 9 together, while at the same time eliminating any air trapped inside turn-up 4 of body ply 2. The effect of curing on each elastomer ring 9, which constitutes a bead filler 8, is shown clearly in FIGS. 7 and 8 showing elastomer ring 9 before and after curing respectively: after curing, the gaps, and therefore any air, inside turn-up 4 of body ply 2 (both between body ply 2 and elastomer ring 9, and inside elastomer ring 9 itself) are eliminated.

The other parts of tyre 1 (tread 5, tread belt 6, sidewalls 7, and other parts not shown, such as the innerliner and abrasion gum strips (AGS)) are assembled in known manner and therefore not mentioned in the above description of the building of tyre 1, which is obviously more complex than in the description, which is limited solely to a detailed account of the steps involving bead fillers 8. It is particularly important to note that curing is performed after tyre 1 is built, i.e. after all the component parts of tyre 1 have been assembled.

Figure 6:
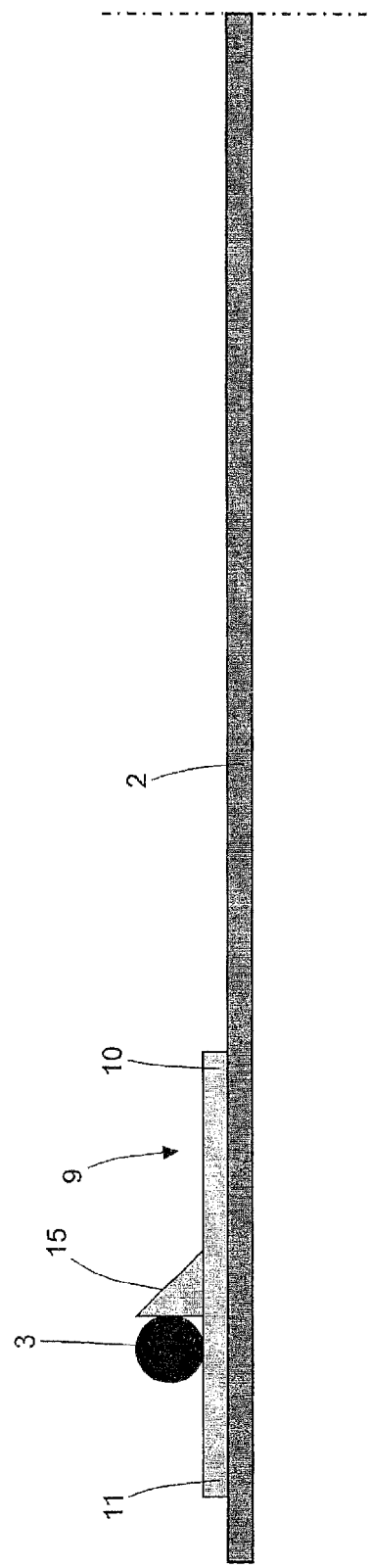
FIG. 6 shows an alternative embodiment of the FIG. 5 detail.

In the FIG. 6 variation, each bead filler 8 also comprises an elastomer ring 15, which is initially placed alongside bead 3 and on top of elastomer ring 9, before body ply 2 is turned up, and is subsequently enclosed in elastomer ring 9 when this is folded into a U about bead 3. Each elastomer ring 15 preferably has a right-triangle-shaped cross section with a first side resting on elastomer ring 9, and a second side resting against bead 3, and acts as a "filler" to eliminate the gaps (and therefore trapped air) inside elastomer ring 9 when this is folded into a U about bead 3.

In the FIG. 9-11 embodiments, the two opposite ends 10 and 11 of elastomer ring 9 are at different heights. In the preferred embodiments shown in FIGS. 9 and 11, the inner end 10 of elastomer ring 9 is higher than the outer end 11; but, in the alternative embodiment shown in FIG. 10, the inner end 10 of elastomer ring 9 is lower than the outer end 11.

As shown in FIG. 9, the difference ΔH in height between the two opposite ends 10 and 11 of elastomer ring 9 is preferably over 10 mm and between ⅙ and ½ of the distance D between the tip of the higher end and the base of elastomer ring 9. In a preferred embodiment, the difference ΔH in height between the two opposite ends 10 and 11 of elastomer ring 9 is roughly ⅓ of the distance D between the tip of the higher end and the base of elastomer ring 9.

In the preferred embodiments in FIGS. 9 and 10, the higher end of elastomer ring 9 projects from turn-up 4 of body ply 2; and the thickness of elastomer ring 9 preferably ranges between 0.2 mm and 0.8 mm at the end of (i.e. at the point where elastomer ring 9 projects from) turn-up 4 of body ply 2. When the higher end of elastomer ring 9 projects from turn-up 4 of body ply 2, the two portions of turn-up 4 do not contact directly, but are separated by at least one end of elastomer ring 9, thus making it more difficult for the two portions of turn-up 4 to detach. This is achieved by interposing between the two portions of turn-up 4 of body ply 2 the higher end of elastomer ring 9 projecting from turn-up 4: being highly elastic, elastomer ring 9 allows the two portions of turn-up 4 to move safely by small amounts with respect to each other, to accommodate the deformation to which tyre 1 is subjected under load.

In the FIGS. 11 and 12 embodiments, the higher end of elastomer ring 9 is located inside turn-up 4 of body ply 2. It is important to note that the thickness of elastomer ring 9 at the end of turn-up 4 of body ply 2 has a significant effect on the stress exerted on the two portions of turn-up 4; and the above thickness range of 0.2 mm to 0.8 mm minimizes this stress.

In a preferred embodiment, elastomer ring 9 is made from a softer elastomer mix than a conventional bead filler. Elastomer ring 9 is normally made from an elastomer mix with a 50% deformation modulus of 1 to 10 MPa and of 100-500% ultimate elongation, and, in a preferred embodiment, is made from an elastomer mix with a 50% deformation modulus of 2.5 to 7 MPa and of 130-450% ultimate elongation. In an alternative embodiment, elastomer ring 9 is made from the same elastomer mix as a conventional bead filler.

Tyre 1 as described above has numerous advantages.

In particular, it is cheap and easy to produce, by having two bead fillers 8 of much smaller mass than a similar conventional tyre. In other words, the bead filler 8 described is much smaller and therefore much lighter, with as much as 50-60% less mass, than a conventional bead filler.

Bead filler 8 described is made of a softer (even much softer) elastomer mix than conventional bead fillers. This is made possible by the corresponding elastomer ring 9 resting completely flat on body ply 2 when building the tyre, which means bead filler 8 need not remain "upright" or perpendicular to body ply 2 (as in the building of conventional tyres). Because bead filler 8 is much lighter (i.e. much smaller in volume) than conventional bead fillers, the reduction in rigidity at the sidewall of tyre 1 resulting from the softer elastomer mix is negligible and more than compensated by the advantages : the soft elastomer mix of bead filler 8 prevents detachment of the two portions of turn-up 4 of body ply 2, and safely allows a small amount of relative movement of the turn-up portions to accommodate the deformation to which tyre 1 is subjected under load, thus increasing the working life and maintaining longer-term performance of tyre 1. More specifically, by deforming more readily under load, the softer bead filler 8 absorbs deformation-induced stress, thus preventing it from being transferred to the join area of turn-up 4 of body ply 2, which therefore undergoes much less stress, and has a longer working life than that of a conventional tyre.

Figure 13:
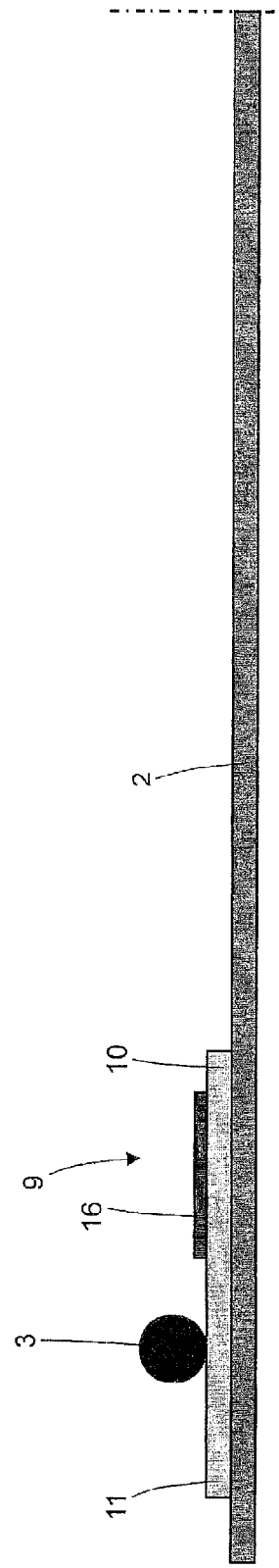
FIG. 13 shows a larger-scale view of an alternative embodiment of the FIG. 5 detail.

In the FIG. 13 embodiment, a further elastomer ring 16 is placed on top of each elastomer ring 9, further inwards with respect to bead 3. In other words, elastomer rings 9 and 16 are initially placed flat on the still-flat body ply 2 (as shown in FIG. 13), and are folded while forming the corresponding turn-up 4 of body ply 2. Elastomer ring 16 is narrower and normally thinner than elastomer ring 9 (e.g. elastomer ring 9 may be 60 mm wide and 0.8 mm thick, as compared with a 20 mm wide, 0.4 mm thick elastomer ring 16), and is made from a softer elastomer mix. The main function of elastomer ring 9 is therefore substantially structural (i.e. increasing the rigidity of the bead 3 area), while elastomer ring 16 substantially serves to allow a small amount of safe relative movement of the two turn-ups 4 of body ply 2 to accommodate the deformation to which tyre 1 is subjected under load (and so increase the working life and maintain longer-term performance of tyre 1). In other words, elastomer ring 9, being substantially designed as a structural part (i.e. to increase the rigidity of the bead 3 area), is made from a tougher elastomer mix, whereas elastomer ring 16, being substantially designed to allow a small amount of safe relative movement of the two portions of turn-up 4 of body ply 2, is made from a softer elastomer mix.

The final embodiment of bead filler 8 can easily be altered when building tyre 1. For example, switching from the FIG. 9 to the FIG. 10 embodiment simply involves altering the position of elastomer ring 9 with respect to bead 3 on tyre building drum 12. More generally speaking, the final embodiment of bead filler 8 can be altered by simply altering the width of elastomer ring 9 and the position of elastomer ring 9 with respect to bead 3 on tyre building drum 12.

Body ply 2 supports two abrasion gum strips (AGSs) on the outside, under sidewalls 7 at beads 3. When tyre 1 is fitted to the wheel rim, the abrasion gum strips contact the edges of the rim, and so are made of a highly abrasion-resistant elastomer mix to prevent contact between tyre 1 and the wheel rim from locally damaging body ply 2. In tyre 1 described, the abrasion gum strips may be thicker and so have a longer working life (i.e. better wear resistance) than on conventional tyres. This is due to bead filler 8 being more elastic than conventional bead fillers (i.e. being made from a softer elastomer mix, and comprising two superimposed ends of elastomer ring 9 prior to curing). So, when the abrasion strip is applied, bead filler 8 deforms locally to "make room" for it, with no local reduction in the thickness of body ply 2. (In other words, applying a thicker than normal abrasion gum strip is compensated for by desired local deformation of bead filler 8, rather than undesired local deformation of body ply 2.) That is, when the green tyre 1 is inserted into the curing mold, it is bead fillers 8 that deform to adjust green tyre 1 to the shape of the mold, while body ply 2 undergoes no undesired deformation.

Finally, tyre 1 described is cheap and easy to produce, by simplifying the building process as compared with conventional tyres. That is, when building a conventional tyre, each bead filler must be fitted to the bead before the tyre is built. This is a particularly complex operation, which must ensure firm, long-lasting adhesion of the bead filler to the bead, to avoid detachment when building the tyre (i.e. prior to curing). Bead filler 8, on the other hand, is defined by elastomer ring 9, which is folded into a U about bead 3, thus making it impossible for bead filler 8 to detach from bead 3.

The invention claimed is:

1. A tyre comprising:
    two beads;
    a toroidal body ply wound about the two beads to form two turn-ups; and
    two bead fillers, each of which contacts a bead, is at least partly enclosed inside a turn-up of the body ply and comprises a first elastomer ring, which is placed between the body ply and the bead, is turned up about the bead to bring into close proximity two opposite ends of the first elastomer ring that are connected to each other by the curing;
    wherein a higher end of the first elastomer ring projects from the turn-up of the body ply such that an outer surface of the higher end of the first elastomer ring is not in direct contact with a body ply;
    wherein the first elastomer ring is made from a softer elastomer mix than the elastomer covering of the body ply or is made from the same elastomer mix as the elastomer covering of the body ply;
    wherein each bead filler also comprises a second elastomer ring, which is placed on top of the first elastomer ring between the two opposite ends of the first elastomer ring; and
    wherein each second elastomer ring is made from a softer elastomer mix than the first elastomer ring.

2. The tyre of claim 1, wherein an inner end of the first elastomer ring is higher than an outer end of the first elastomer ring.

3. The tyre of claim 1, wherein the difference ($\Delta H$) in height between the two opposite ends of the first elastomer ring is $\frac{1}{6}$ to $\frac{1}{2}$ the distance (D) between the tip of the higher end of the first elastomer ring and the base of the first elastomer ring.

4. The tyre of claim 1, wherein the difference ($\Delta H$) in height between the two opposite ends of the first elastomer ring is more than 10 mm.

5. The tyre of claim 1, wherein the first elastomer ring is 0.2 to 0.8 mm thick at the end of the turn-up of the body ply.

6. The tyre of claim 1, wherein each second elastomer ring is narrower and thinner than the first elastomer ring.

7. The tyre of claim 1, wherein the first elastomer ring has a rectangular cross section, and is of constant thickness.

8. The tyre of claim 1, wherein the first elastomer ring is made from an elastomer mix with a 50% deformation modulus of 1 to 10 MPa, and of 100-500% ultimate elongation.

9. The tyre of claim 8, wherein the first elastomer ring is made from an elastomer mix with a 50% deformation modulus of 2.5 to 7 MPa, and of 130-450% ultimate elongation.

10. The tyre of claim 1, wherein the bead filler also comprises a third elastomer ring, which is placed alongside the bead and is enclosed by the first elastomer ring turned up about the bead.

11. The tyre of claim 10, wherein the third elastomer ring has a cross section in the shape of a right-triangle having a first side resting on the first elastomer ring, and a second side resting on the bead.

12. A method of building a tyre, the method comprising the steps of:
    fitting a body ply about a building drum;
    placing two beads on top of the body ply;
    placing a first elastomer ring, flat, between the body ply and each bead; turning the body ply up about the two beads to form two turn-ups, each at least partly enclosing a bead and to turning each first elastomer ring up about the bead to bring two opposite ends of the first elastomer ring into close proximity;
    placing a second elastomer ring alongside the bead and on top of the first elastomer ring, before turning up the body ply; and
    curing the body ply together with the beads once the tyre is built to combine the two opposite ends of the first elastomer ring, while at the same time eliminating the air trapped inside the turn-up of the body ply;
    wherein a higher end of the first elastomer ring projects from the turn-up of the body ply such that an outer surface of the higher end of the first elastomer ring is not in direct contact with a body ply;
    wherein the first elastomer ring is made from a softer elastomer mix than the elastomer covering of the body ply or is made from the same elastomer mix as the elastomer covering of the body ply; and
    wherein each second elastomer ring is made from a softer elastomer mix than the first elastomer ring.

13. The method of claim 12, further comprising the steps of:
    placing the two first elastomer rings on top of the body ply, after fitting the body ply about the building drum; and
    placing the two beads on top of the two first elastomer rings, after fitting the two first elastomer rings about the building drum and on top of the body ply.

14. The method of claim 12, wherein:
    an inner end of the first elastomer ring is higher than an outer end of the first elastomer ring; and
    the difference ($\Delta H$) in height between the two opposite ends of the first elastomer ring is $\frac{1}{6}$ to $\frac{1}{2}$ the distance (D) between the tip of the higher end of the first elastomer ring and the base of the first elastomer ring.

15. The method of claim 12, further comprising the step of placing a third elastomer ring on top of the first elastomer ring, alongside the bead, and further inwards with respect to the bead so that, when turning up the body ply, the third elastomer ring is placed between the two opposite ends of the first elastomer ring.

16. A tyre comprising:
two beads;
a toroidal body ply wound about the two beads to form two turn-ups; and
two bead fillers, each of which contacts a bead, is at least partly enclosed inside a turn-up of the body ply and comprises a first elastomer ring, which is placed between the body ply and the bead, is turned up about the bead to bring into close proximity two opposite ends of the first elastomer ring that are connected to each other by the curing;
wherein the higher end of the first elastomer ring projects from the turn-up of the body ply;
wherein the first elastomer ring is made from a softer elastomer mix than the elastomer covering of the body ply or is made from the same elastomer mix as the elastomer covering of the body ply;
wherein each bead filler also comprises a second elastomer ring, which is placed on top of the first elastomer ring between the two opposite ends of the first elastomer ring; and wherein each second elastomer ring is made from a softer elastomer mix than the first elastomer ring.

17. The tyre of claim 16, wherein each second elastomer ring is narrower and thinner than the first elastomer ring.

18. A tyre comprising:
two beads;
a toroidal body ply wound about the two beads to form two turn-ups; and
two bead fillers, each of which contacts a bead, is at least partly enclosed inside a turn-up of the body ply and comprises a first elastomer ring, which is placed between the body ply and the bead, is turned up about the bead to bring into close proximity two opposite ends of the first elastomer ring that are connected to each other by the curing;
wherein a higher end of the first elastomer ring projects from the turn-up of the body ply such that an outer surface of the higher end of the first elastomer ring is not in direct contact with a body ply;
wherein the first elastomer ring is made from a softer elastomer mix than the elastomer covering of the body ply or is made from the same elastomer mix as the elastomer covering of the body ply;
wherein each bead filler also comprises a second elastomer ring, which is placed on top of the first elastomer ring between the two opposite ends of the first elastomer ring; and
wherein each second elastomer ring is narrower and thinner than the first elastomer ring.

19. The A tyre as claimed in claim 18, wherein the bead filler also comprises a third elastomer ring, which is placed alongside the bead and is enclosed by the first elastomer ring turned up about the bead.

20. The tyre as claimed in claim 19, wherein the third elastomer ring has a cross section in the shape of a right-triangle having a first side resting on the first elastomer ring, and a second side resting on the bead.

21. A tyre comprising:
two beads;
a toroidal body ply wound about the two beads to form two turn-ups; and
two bead fillers, each of which contacts a bead, is at least partly enclosed inside a turn-up of the body ply and comprises a first elastomer ring, which is placed between the body ply and the bead, is turned up about the bead to bring into close proximity two opposite ends of the first elastomer ring that are connected to each other by the curing;
wherein the higher end of the first elastomer ring projects from the turn-up of the body ply;
wherein the first elastomer ring is made from a softer elastomer mix than the elastomer covering of the body ply or is made from the same elastomer mix as the elastomer covering of the body ply;
wherein each bead filler also comprises a second elastomer ring, which is placed on top of the first elastomer ring between the two opposite ends of the first elastomer ring; and
wherein each second elastomer ring is narrower and thinner than the first elastomer ring.

* * * * *